(12) United States Patent
Tsuda

(10) Patent No.: US 10,476,118 B2
(45) Date of Patent: Nov. 12, 2019

(54) AIR BATTERY AND BUILDING INCLUDING THE SAME

(71) Applicant: Mari Tsuda, Nara (JP)

(72) Inventor: Mari Tsuda, Nara (JP)

( * ) Notice: Subject to any disclaimer, the term of this patent is extended or adjusted under 35 U.S.C. 154(b) by 0 days.

(21) Appl. No.: 15/580,065

(22) PCT Filed: Jun. 3, 2016

(86) PCT No.: PCT/JP2016/066614
§ 371 (c)(1),
(2) Date: Dec. 6, 2017

(87) PCT Pub. No.: WO2016/199697
PCT Pub. Date: Dec. 15, 2016

(65) Prior Publication Data
US 2018/0301775 A1    Oct. 18, 2018

(30) Foreign Application Priority Data
Jun. 11, 2015    (JP) ................. 2015-118099

(51) Int. Cl.
*H01M 12/06* (2006.01)
*H01M 4/38* (2006.01)

(52) U.S. Cl.
CPC ........... *H01M 12/065* (2013.01); *H01M 4/38* (2013.01); *H01M 12/06* (2013.01); *H01M 2300/0031* (2013.01); *Y02E 60/128* (2013.01)

(58) Field of Classification Search
CPC ....................... H01M 12/06; H01M 12/065
See application file for complete search history.

(56) References Cited

U.S. PATENT DOCUMENTS

2009/0311567 A1* 12/2009 Visco .................. H01M 2/1673
429/403
2010/0203394 A1   8/2010 Bae et al.
(Continued)

FOREIGN PATENT DOCUMENTS

JP    2004-317086    11/2004
JP    2006-236676    9/2006
(Continued)

OTHER PUBLICATIONS

International Search Report for PCT/JP2016/066614 dated Jul. 5, 2016, 2 pages.
(Continued)

*Primary Examiner* — Barbara L Gilliam
*Assistant Examiner* — Nathanael T Zemui
(74) *Attorney, Agent, or Firm* — Nixon & Vanderhye P.C.

(57) ABSTRACT

An air battery includes a positive electrode using oxygen as a positive electrode active material, a negative electrode containing metal as a negative electrode active material, and a sheet layer interposed between the positive electrode and the negative electrode. The positive electrode is formed in a solid state containing an electrolyte for ionizing the metal of the negative electrode and conductive particles. The sheet layer is made of a material containing no electrolytic solution and exhibiting hygroscopic properties. The sheet layer allows the electrolyte contained in the positive electrode to penetrate toward the negative electrode, and allows metal ions generated in the negative electrode to penetrate toward the positive electrode.

9 Claims, 10 Drawing Sheets

(56) References Cited

U.S. PATENT DOCUMENTS

| | | | |
|---|---|---|---|
| 2012/0237838 A1* | 9/2012 | Uesaka | H01M 12/06 |
| | | | 429/405 |
| 2013/0209899 A1 | 8/2013 | Suzuki | |
| 2014/0205917 A1 | 7/2014 | Mizuno | |
| 2015/0010833 A1 | 1/2015 | Amendola et al. | |
| 2017/0352936 A1* | 12/2017 | Jin | H01M 8/16 |

FOREIGN PATENT DOCUMENTS

| JP | 2010-037881 | 2/2010 |
|---|---|---|
| JP | 2012-517075 | 7/2012 |
| JP | 2013-137868 | 7/2013 |
| JP | 2014-075269 | 4/2014 |
| JP | 2014-203552 | 10/2014 |
| JP | 2015-506079 | 2/2015 |
| JP | 2015-041499 | 3/2015 |
| JP | 2015-056243 | 3/2015 |

OTHER PUBLICATIONS

Supplemental European Search Report in EP Application No. 16 80 7404.5, dated Feb. 1, 2019 (7 pages).
Korean first office action dated May 11, 2018, in Patent Application No. KR 10-2017-7035662.
Korean Decision of Rejection dated Sep. 27, 2018 in Patent Application No. KR 10-2017-7035662.

* cited by examiner

AIR BATTERY AND BUILDING INCLUDING THE SAME

This application is the U.S. national phase of International Application No. PCT/JP2016/066614 filed Jun. 3, 2016 which designated the U.S. and claims priority to JP Patent Application No. 2015-118099 filed Jun. 11, 2015, the entire contents of each of which are hereby incorporated by reference.

TECHNICAL FIELD

The present invention relates to an air battery and a building including the air battery.

BACKGROUND ART

Typically, an air battery using, as a positive electrode active material, oxygen contained in air has been known. The air battery commonly includes a negative electrode, a positive electrode, and an electrolytic solution layer provided between the negative electrode and the positive electrode. For example, the positive electrode has a configuration containing carbon, whereas the negative electrode is made of a metal material such as metal lithium. Reduction reaction using oxygen is performed in the positive electrode, whereas metal ionization reaction is performed to release electrons in the negative electrode. In this manner, the air battery performs, as a whole, electric generation.

Patent Literatures 1 and 2 describe examples of the electrolytic solution layer. That is, Patent Literature 1 discloses an electrolytic solution holding layer for holding, as an electrolytic solution, a water solution of potassium chloride, sodium chloride, potassium hydroxide, etc. Moreover, Patent Literature 2 describes a liquid tank filled with an organic electrolytic solution of propylene carbonate etc.

CITATION LIST

Patent Literature

PATENT LITERATURE 1: Japanese Unexamined Patent Application Publication No. 2015-41499
PATENT LITERATURE 2: Japanese Unexamined Patent Application Publication No. 2015-56243

SUMMARY OF THE INVENTION

Problems to be Solved by the Invention

However, in the above-described typical air battery having the electrolytic solution layer, there are problems that battery performance is significantly degraded due to evaporation or volatilization of an electrolytic solution and that a terminal provided at the electrode is corroded. For these reasons, measures for preventing a decrease in the electrolytic solution, such as prevention of evaporation or volatilization of the electrolytic solution or proper refilling of the electrolytic solution, need to be made.

In recent years, utilization of a solar battery (a solar panel) as an auxiliary power source has been advanced for a building such as a residence. However, the solar battery has problems that a placement location is limited to, e.g., a roof easily catching the sun and that electric generation cannot be performed only during the day in good weather.

The present invention has been made in view of the above-described points, and a main object of the present invention is to provide stable battery performance of an air battery without measures for avoiding a decrease in an electrolytic solution.

Solution to the Problems

An air battery of the present invention includes a negative electrode containing metal as a negative electrode active material, a positive electrode formed in a solid state containing an electrolyte for ionizing the metal of the negative electrode and conductive particles and using oxygen as a positive electrode active material, and a sheet layer interposed between the positive electrode and the negative electrode, allowing the electrolyte contained in the positive electrode to penetrate toward the negative electrode, and allowing metal ions generated in the negative electrode to penetrate toward the positive electrode. The sheet layer is made of a material containing no electrolytic solution and exhibiting hygroscopic properties. The electrolyte contained in the positive electrode is able to penetrate the sheet layer having absorbed moisture from air, thereby moving toward the negative electrode. The metal ions generated in the negative electrode are able to penetrate the sheet layer having absorbed the moisture from the air, thereby moving toward the positive electrode.

The positive electrode preferably includes a base material carrying the electrolyte and the conductive particles and provided with many holes.

The base material is preferably formed such that many fibrous materials are collectively integrated, and clearances are preferably provided among the fibrous materials to form the many holes. Further, the fibrous materials are preferably fibrous materials forming Japanese paper.

An electrolyte layer containing the electrolyte is preferably provided on a surface portion of the positive electrode. Further, the electrolyte layer is preferably formed by printing.

The positive electrode may be made of solid resin in which the electrolyte and the conductive particles are dispersed.

The electrolyte preferably contains sodium chloride, and the conductive particles are preferably made of a carbon material. Moreover, the electrolyte preferably contains sodium hydrogen carbonate.

In a building of the present invention, an air battery is housed in at least one of a wall, an underfloor portion, and an underroof portion. The air battery includes a negative electrode containing metal as a negative electrode active material, a positive electrode formed in a solid state containing an electrolyte for ionizing the metal of the negative electrode and conductive particles and using oxygen as a positive electrode active material, and a sheet layer interposed between the positive electrode and the negative electrode, allowing the electrolyte contained in the positive electrode to penetrate toward the negative electrode, and allowing metal ions generated in the negative electrode to penetrate toward the positive electrode. The sheet layer is made of a material containing no electrolytic solution and exhibiting hygroscopic properties. The electrolyte contained in the positive electrode is able to penetrate the sheet layer having absorbed moisture from air, thereby moving toward the negative electrode. The metal ions generated in the negative electrode are able to penetrate the sheet layer having absorbed the moisture from the air, thereby moving toward the positive electrode.

The positive electrode preferably includes a base material carrying the electrolyte and the conductive particles and provided with many holes.

Effects of the Invention

In the air battery of the present invention, the sheet layer does not contain the electrolytic solution, and exhibits the hygroscopic properties. The electrolyte of the positive electrode penetrates the sheet layer having absorbed the moisture from the air, and moves toward the negative electrode. Then, such an electrolyte ionizes the metal of the negative electrode to generate electrons. Meanwhile, the metal ions generated in the negative electrode penetrate the sheet layer having absorbed the moisture from the air, and move toward the positive electrode. Moreover, the metal ions move over the conductive particles in the positive electrode. In the positive electrode, oxygen receives the electrons to react with the metal ions. In this manner, the air battery performs electric generation.

As described above, it is configured such that the air battery of the present invention includes the solid positive electrode containing the electrolyte, the sheet layer, and the negative electrode, and contains no electrolytic solution. Stable battery performance can be provided without measures for avoiding a decrease in the electrolytic solution. Further, since no electrolytic solution is used, the effect of facilitating handling of the air battery can be also provided. In addition, it is configured such that the sheet layer is interposed between the positive electrode and the negative electrode, and therefore, the thickness of the air battery can be significantly decreased. As a result, the degree of freedom in a location where the air battery is placed can be increased.

With the configuration in which the positive electrode includes the base material provided with the many holes and the base material carries the electrolyte and the conductive particles, surrounding air can be taken in the base material through the holes. Consequently, a contact area between the positive electrode and the air increases, and an electric generation efficiency can be significantly increased.

Further, the base material is formed of the assembly of the many fibrous materials, and therefore, the density of the fibrous materials is adjusted so that the clearances among the fibrous materials can be easily formed. Thus, the base material provided with the many holes formed by these clearances can be favorably formed. In particular, the fibrous materials forming the Japanese paper are more preferably used because the highly-durable lightweight base material can be provided.

For connecting a wire etc. to the positive electrode, a terminal such as a metal plate is preferably provided at the positive electrode. However, when the electrolyte of the positive electrode contacts the terminal, the terminal might be corroded. For this reason, the electrolyte layer containing the electrolyte is provided on the particular surface portion of the positive electrode. Thus, the electrolyte layer and the terminal can be arranged separated from each other, and penetration of the electrolyte toward the terminal can be reduced. Consequently, corrosion of the terminal due to the electrolyte can be reduced. Moreover, the electrolyte layer can be favorably formed by printing.

The positive electrode is made of the solid resin in which the electrolyte and the conductive particles are dispersed, and therefore, a stable shape of the positive electrode containing the electrolyte and the conductive particles can be realized.

The electrolyte contains the sodium chloride, and the conductive particles are carbon. Thus, favorable battery performance can be provided. In particular, the sodium hydrogen carbonate is contained as the electrolyte so that the electric generation efficiency can be more increased.

With the air battery, it is, according to the building of the present invention, not necessary to take sunlight into consideration as in the case of a solar battery. Thus, an area where the battery can be placed in the building is expanded, and electric generation can be performed regardless of the time of day or night. As a result, the electric generation amount per day can be significantly increased. In addition, the air battery is housed effectively utilizing, e.g., an inner space of the wall, the underfloor portion, or the underroof portion. Thus, the appearance of the building and a living space in the building can be favorably ensured while sufficient power can be provided.

In particular, the air battery is configured such that the sheet layer is interposed between the positive electrode and the negative electrode, and therefore, significant size reduction can be realized due to thickness reduction of the air battery. Thus, the air battery can be favorably placed in the wall, the underfloor portion, or the underroof portion. In addition, no electrolytic solution is used, and therefore, maintenance management of the air battery is significantly facilitated.

DESCRIPTION OF THE EMBODIMENTS

Embodiments of the present invention will be described below in detail with reference to the drawings. Note that the present invention is not limited to the embodiments below.

First Embodiment

Figure 1:
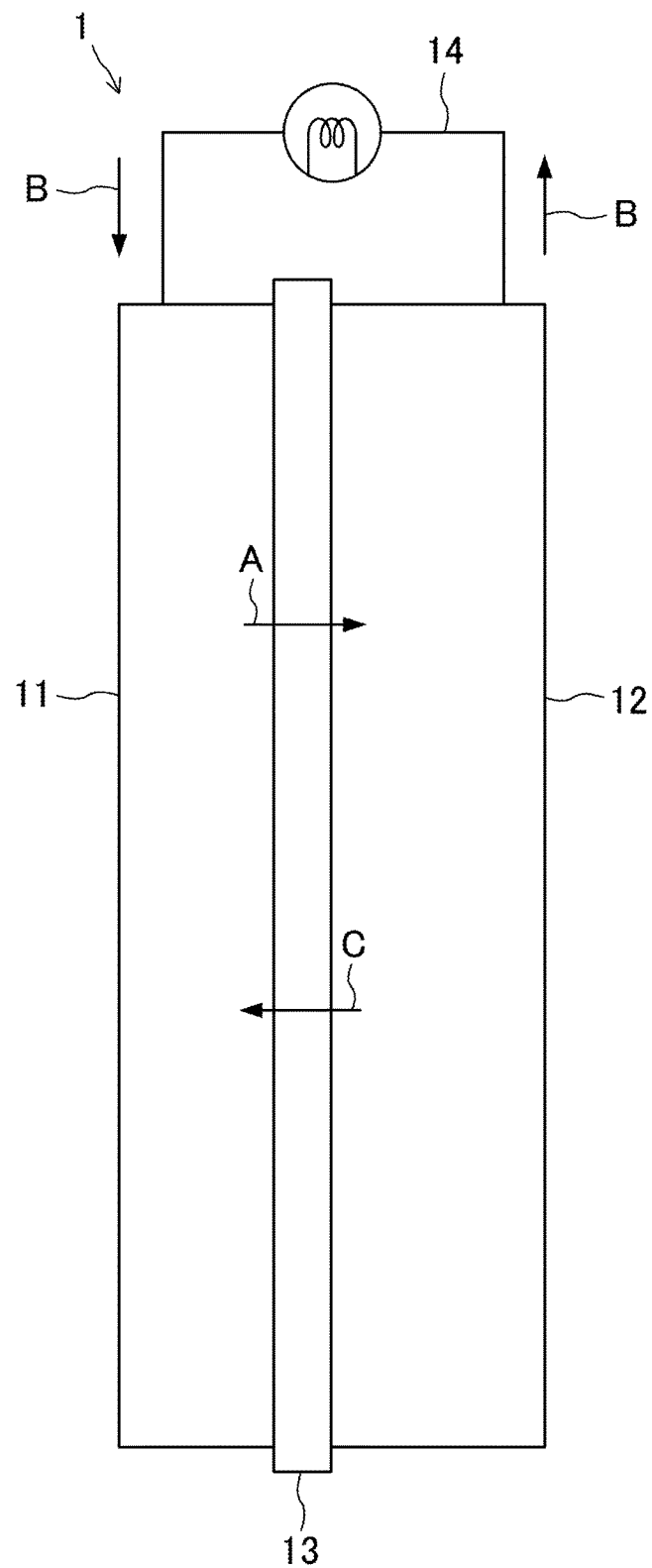
FIG. 1 is a side view of a structure of an air battery in a first embodiment.

FIG. 1 schematically illustrates the principle of an air battery 1 in a first embodiment. As illustrated in FIG. 1, the air battery 1 includes a positive electrode 11 using oxygen as a positive electrode active material, a negative electrode 12 containing metal as a negative electrode active material, and a sheet layer 13 interposed between the positive electrode 11 and the negative electrode 12. The sheet layer 13 contacts each of the positive electrode 11 and the negative electrode 12.

The metal as the negative electrode active material contained in the negative electrode 12 includes, for example, aluminum. In the present embodiment, a rectangular aluminum plate forms the negative electrode 12. The thickness of the negative electrode 12 decreases as electric generation (electric discharge) by the air battery 1 progresses. Thus, such a thickness may be set according to a use period of the air battery 1. In the present embodiment, the thickness of the negative electrode 12 is set to, e.g., about 3 mm. Note that the metal contained in the negative electrode 12 may be not only the aluminum, but also other types of metal such as magnesium and metal lithium.

The positive electrode 11 is formed in a solid state containing an electrolyte for ionizing the metal of the negative electrode 12 and conductive particles. Moreover, the positive electrode 11 is made of solid resin such that the electrolyte and the conductive particles are dispersed.

The conductive particles contained in the positive electrode 11 allow metal ions and electrons generated in the negative electrode 12 to move in the positive electrode 11. The conductive particles are, e.g., activated carbon particles. Other carbon materials (e.g., carbon black and graphite) than activated carbon can be utilized for these conductive particles. However, for easily taking oxygen in the positive electrode 11, porous activated carbon is preferably utilized. Moreover, other conductive materials such as metal may be used for the conductive particles.

The electrolyte contained in the positive electrode 11 is, e.g., sodium chloride. Salt (coarse salt) with relatively-coarse particles, such as native salt, is preferably used for the sodium chloride as the electrolyte. As a result of experiment by the inventor(s) of the present application, it has been found that such an electrolyte enhances battery performance of the air battery 1. That is, by means of the coarse salt such as the native salt, the decomposition rate of the metal of the negative electrode 12 increases, and the entirety of the negative electrode 12 can be substantially uniformly decomposed.

Note that not only the sodium chloride but also an electrolyte for easily ionizing the metal material of the negative electrode 12 may be applied as the electrolyte according to the metal material of the negative electrode 12.

The positive electrode 11 uses the solid resin such as vinyl chloride as a base material. In such resin, the electrolyte (the sodium chloride) and the conductive particles (the activated carbon particles) are dispersively mixed. The resin forming the positive electrode 11 is preferably a highly-durable material, and may be not only the vinyl chloride but also other types of synthetic resin such as polycarbonate. The positive electrode 11 is formed in, e.g., a rectangular plate shape.

For enhancing the battery performance, the electrolyte (the sodium chloride) falls, as a proper amount, within a range of equal to or greater than about 3 mass % and about 20 mass % with respect to the resin, and around 5 mass % of the electrolyte is optimal. On the other hand, for enhancing the battery performance, the activated carbon as the conductive particles falls, as a proper amount, within a range of equal to or greater than 30 mass % and about 60 mass % with respect to the resin, and around 45 mass % of the activated carbon is optimal.

Note that a catalyst for activating reduction reaction may be added to the positive electrode 11. Moreover, the positive electrode 11 may be provided with a conductive plate on the opposite side of the sheet layer 13, and a wire may be connected to the conductive plate. For example, a metal material exhibiting favorable conductivity, such as copper, is preferable as the material of the conductive plate. Note that the conductive plate preferably has the minimum possible area for avoiding blocking of an oxygen supply to the positive electrode 11.

The sheet layer 13 is configured to allow the electrolyte contained in the positive electrode 11 to penetrate toward the negative electrode 12 and to allow the metal ions generated in the negative electrode 12 to penetrate toward the positive electrode 11. Moreover, the sheet layer 13 is made of an insulating material.

For example, the sheet layer 13 can be made of a hygroscopic material such as paper or fabric. The thickness of the sheet layer 13 is, e.g., about 0.5 mm. With the hygroscopic properties of the sheet layer 13, the electrolyte of the positive electrode 11 penetrates into the sheet layer 13 having absorbed moisture from air, and therefore, can move from the positive electrode 11 to the negative electrode 12. Further, the metal ions generated in the negative electrode 12 penetrate into the sheet layer 13 having absorbed the moisture from the air, and therefore, can move from the negative electrode 12 to the positive electrode 11.

The sheet layer 13 may be made of other materials than the paper and the fabric. For example, the sheet layer 13 may be formed of a sheet material made of a resin material such as vinyl chloride. In this case, e.g., around 3 mass % of an electrolyte (e.g., sodium chloride) is preferably dispersively mixed in the resin sheet material. This can favorably generate battery reaction.

Further, even in a case where the sheet layer 13 is made of each material such as the paper/fabric and the resin, a plurality of through-holes (not shown) are preferably formed at the sheet layer 13. This allows much easier penetration of the electrolyte and the metal ions, leading to higher battery performance.

The sheet layer 13 does not necessarily contain an electrolyte before use of the air battery 1. However, the sheet layer 13 preferably contains, in advance, the same electrolyte as that contained in the positive electrode 11 before use of the air battery 1. This can promptly supply the electrolyte to the negative electrode 12 right after start of use of the air battery 1, leading to smooth start of the battery reaction.

The sheet layer 13 containing the electrolyte in advance can be produced in such a manner that after a sheet material such as paper or fabric has been dipped in a water solution containing about 5 mass % of an electrolyte (sodium chloride), the sheet material is dried, for example.

In the air battery 1, the electrolyte (the sodium chloride) contained in the positive electrode 11 penetrates the sheet layer 13 to move toward the negative electrode 12 as indicated by an arrow A in FIG. 1. The sodium chloride having reached the negative electrode 12 ionizes the metal (the aluminum) forming the negative electrode 12, and generates the electrons.

The electrons generated in the negative electrode 12 flow toward the positive electrode 11 through a wire 14 as indicated by arrows B in FIG. 1. Meanwhile, the metal ions (the aluminum ions) generated in the negative electrode 12 penetrate the sheet layer 13 to move toward the positive electrode 11 as indicated by an arrow C in FIG. 1. The aluminum ions having reached the positive electrode 11 move, in the positive electrode 11, over the conductive particles (the activated carbon) contained in the positive electrode 11. Then, oxygen in air around the positive electrode 11 receives the electrons to react with the aluminum ions. In this manner, electric generation is performed by the air battery 1.

Figure 2:
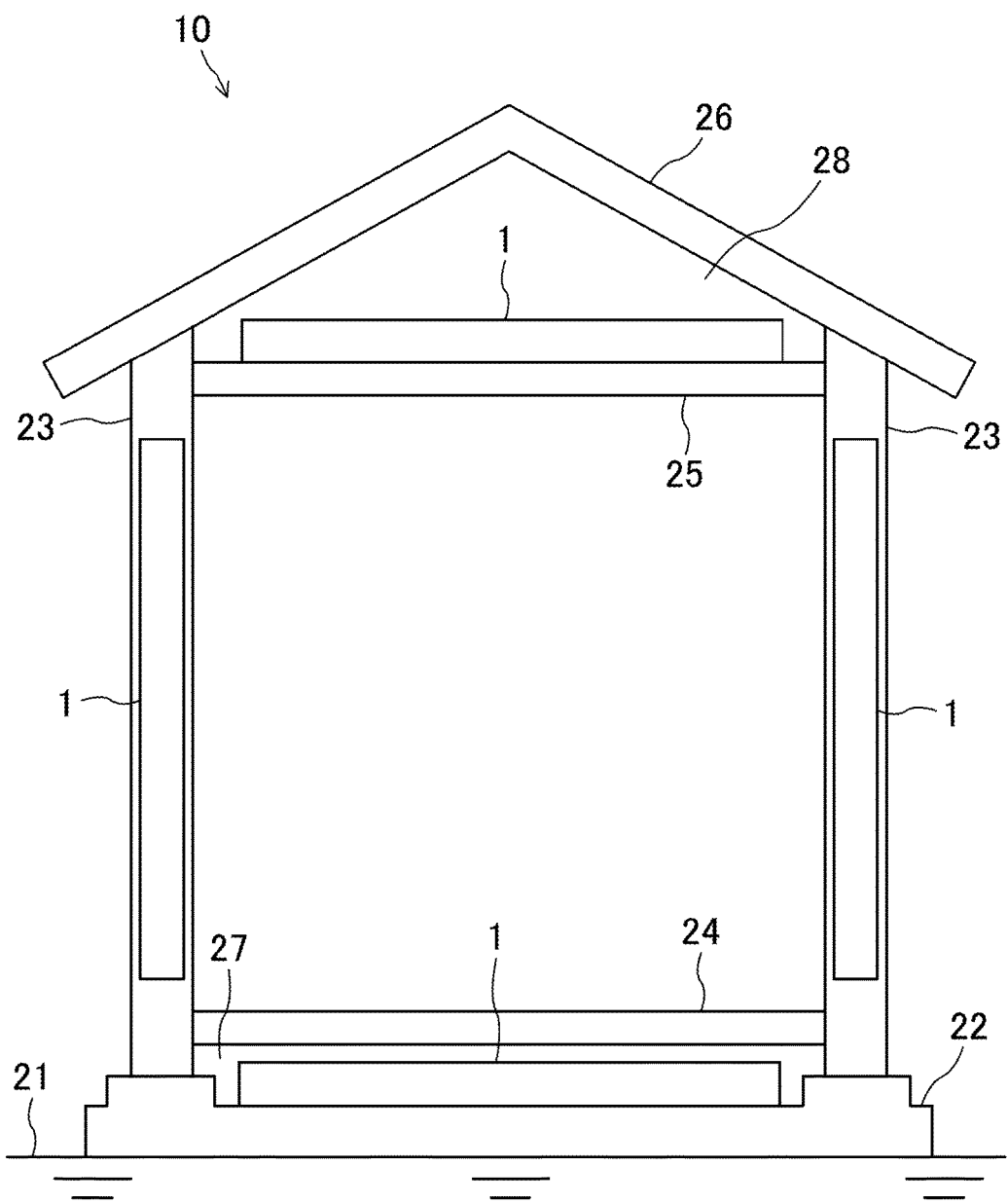
FIG. 2 is a schematic sectional view of a building including air batteries in the first embodiment.
Figure 3:
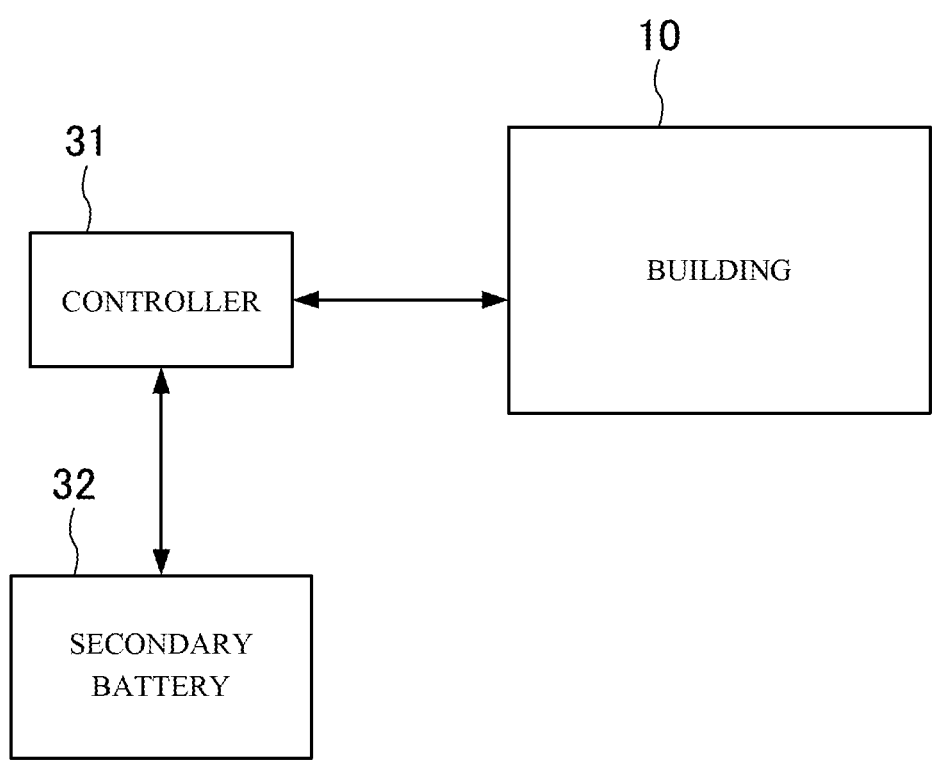
FIG. 3 is a block diagram for describing power control in the building.

FIG. 2 schematically illustrates a building 10 including the air batteries 1. As illustrated in FIG. 3, the building 10 has a foundation 22 formed of a concrete layer placed in a solid state on a ground surface 21, walls 23 such as outer walls and partitions, a floor portion 24, a ceiling portion 25, and a roof portion 26. An underfloor portion 27 is formed between the foundation 22 and the floor portion 24. Moreover, an underroof portion 28 is formed between the ceiling portion 25 and the roof portion 26.

In the building 10 of the present embodiment, the air battery 1 is housed in each of the walls 23, the underfloor portion 27, and the underroof portion 28.

For example, multiple units of the air batteries 1 illustrated in FIG. 2 are housed in the building 10, and are connected together. The output of the air battery 1 per unit is 1 V. These units are connected in series so that a desired voltage can be provided. Each unit of the air battery 1 is entirely formed in a rectangular plate shape, and the thickness of the unit in the direction of stacking the positive electrode 11, the sheet layer 13, and the negative electrode 12 is, e.g., about 5 mm. Moreover, the size of each unit of the air battery 1 is about 75 mm in a longitudinal direction and about 14 mm in a transverse direction, for example. Note that the dimensions of each unit of the air battery 1 are freely changeable according to intended use.

When the air battery 1 performs electric generation for one year, the aluminum thickness decreases by about 0.1 mm. Assuming that the durable life of the building 10 is 50 years and the aluminum thickness is about 5 mm, the air battery 1 can be used as a power source for 50 years in the building 10.

Each wall 23 of the building 10 is formed in a hollow shape, and the air battery 1 is housed in such a wall 23. Each wall 23 is provided with an air introduction port (not shown) for introducing air into the wall 23. In the underfloor portion 27, the air battery 1 is placed on the foundation 22. In the underroof portion 28, the air battery 1 is placed on the ceiling portion 25.

The air batteries 1 are each housed in the walls 23, the underfloor portion 27, and the underroof portion 28 as described above. Thus, the air batteries 1 are not visible from the inside and outside of a room of the building 10 while spaces in the walls 23, the underfloor portion 27, and the underroof portion 28 can be effectively utilized.

FIG. 3 is a block diagram for describing power control in the building 10. The building 10 includes, for properly utilizing the air batteries 1 as the power sources, a controller 31 and a secondary battery 32. The controller 31 is connected to the air batteries 1, and the secondary battery 32 is connected to the controller 31.

The air battery 1 utilizes oxygen contained in surrounding air, thereby performing electric generation. Thus, the air battery 1 constantly performs electric generation regardless of the time of day or night. Meanwhile, power used in the building 10 varies according to the time of day. For this reason, excess or deficiency of power generated by the air batteries 1 is caused with respect to power necessary for the building 10. Note that power necessary for a common home is 8 to 12 Kw/h. In recent years, energy conservation has been advanced, and therefore, the necessary power has been reduced by around 30%. In the building 10 of the present embodiment, a low-power facility such as LED illumination is also placed.

When the power necessary for the building 10 falls below the electric generation amount of the air batteries 1, the controller 31 supplies the power generated by the air batteries 1 to an electric facility in the building 10, and stores surplus power in the secondary battery 32. On the other hand, when the power necessary for the building 10 exceeds the electric generation amount of the air batteries 1, the controller 31 supplies the power generated by the air batteries 1 to the electric facility in the building 10, and supplies the power stored in the secondary battery 32 to the electric facility in the building 10. In this manner, the power generated by the air batteries 1 can be properly utilized.

As described above, according to the air battery 1 of the first embodiment, it is configured such that the positive electrode 11 in the solid state containing the electrolyte, the sheet layer 13, and the negative electrode 12 are provided and that no electrolytic solution is contained. Thus, measures for avoiding a decrease in the electrolytic solution, such as the structure for preventing evaporation or volatilization of the electrolytic solution or the configuration for refilling the electrolytic solution, are not necessary while stable battery performance can be provided. In the case of providing terminals at the positive electrode 11 and the negative electrode 12, no electrolytic solution is used in the air battery 1, and therefore, corrosion of these terminals can be prevented. Further, no electrolytic solution is used, and therefore, handling of the air battery 1 is facilitated.

In addition, it is configured such that the sheet layer 13 is interposed between the positive electrode 11 and the negative electrode 12, and therefore, the thickness of the air battery 1 can be significantly decreased. As a result, the degree of freedom in a location where the air battery 1 is placed can be increased.

Further, it is configured such that the positive electrode 11 is made of the solid resin in which the electrolyte and the conductive particles are dispersed, and therefore, a stable shape of the positive electrode 11 containing the electrolyte and the conductive particles can be realized. In particular, the electrolyte is the sodium chloride, and the conductive particles are the carbon. This can lead to favorable battery performance.

Moreover, the sheet layer 13 exhibits the hygroscopic properties, and therefore, the sheet layer 13 contains the moisture of the air. Thus, the electrolyte of the positive electrode 11 can be favorably moved to the negative electrode 12, and the metal ions of the negative electrode 12 can be favorably moved to the positive electrode 11. Further, it is configured such that the sheet layer 13 contains, in advance, the electrolyte before use of the air battery 1. Thus, the electrolyte can be promptly supplied to the negative electrode 12 right after start of use of the air battery 1, leading to smooth start of the battery reaction.

Further, according to the first embodiment, the air batteries 1 are each placed in the walls 23, the underfloor portion 27, and the underroof portion 28 of the building 10, and therefore, it is not necessary to take sunlight into consideration as in the case of a solar battery. Thus, an area where the battery can be placed in the building 10 is expanded, and electric generation can be performed regardless of the time of day or night. As a result, the electric generation amount per day can be significantly increased. In addition, the air batteries 1 are housed effectively utilizing the inner spaces of the walls 23, the underfloor portion 27, and the underroof portion 28. Thus, the appearance of the building 10 and a living space in the building 10 can be favorably ensured while sufficient power can be provided.

In addition, the metal contained in the negative electrode 12 of the air battery 1 is the aluminum. Thus, the weight of the air battery 1 can be reduced while a load on the structure of the building 10 can be reduced. In particular, the air battery 1 is preferably fixed to the foundation 22 in the underfloor portion 27 because no reinforcement for supporting the air battery 1 is necessary and a relatively-large capacity for housing the air battery 1 can be ensured.

Moreover, the air battery 1 has the positive electrode 11 containing the activated carbon. Thus, the air batteries 1 are each placed in the walls 23, the underfloor portion 27, and the underroof portion 28 so that a heat insulating effect and an odor eliminating effect can be provided. Meanwhile, the air battery 1 has the aluminum layer as the negative electrode 12, and therefore, an antenna for reliably receiving radio waves of mobile terminals in the room is preferably placed.

Note that the air batteries 1 are not necessarily housed in all of the walls 23, the underfloor portion 27, and the underroof portion 28, and may be housed in at least one of these portions. The air battery 1 may be placed not only in the above-described portions, but also on the outside of the building 10 such as an outer wall surface or a roof of the building 10.

In the first embodiment, the example where the air battery 1 is housed in the underfloor portion 27 has been described, but the present invention is not limited to such an example. The air battery 1 may be housed in the floor portion 24. Moreover, the example where the air battery 1 is housed in the underroof portion 28 has been also described, but the present invention is not limited to such an example. The air battery 1 may be housed in the ceiling portion 25. Moreover, in a building 10 with multiple floors, the air battery 1 may be housed between a ceiling portion 25 of a lower floor and a floor portion 24 of an upper floor.

Moreover, the shape of the air battery 1 can be, according to a placement location, not only the rectangular plate shape, but also other optional shapes such as a discoid shape and a triangular plate shape.

The example where the air batteries 1 are placed in the building 10 has been described above, but the present invention is not limited to such an example. The air battery 1 can be placed at a wide variety of solids, movable bodies, etc. having internal spaces, such as automobiles, ships, and airplanes. Further, the air battery 1 can be also utilized as a secondary battery.

Second Embodiment

Figure 4:
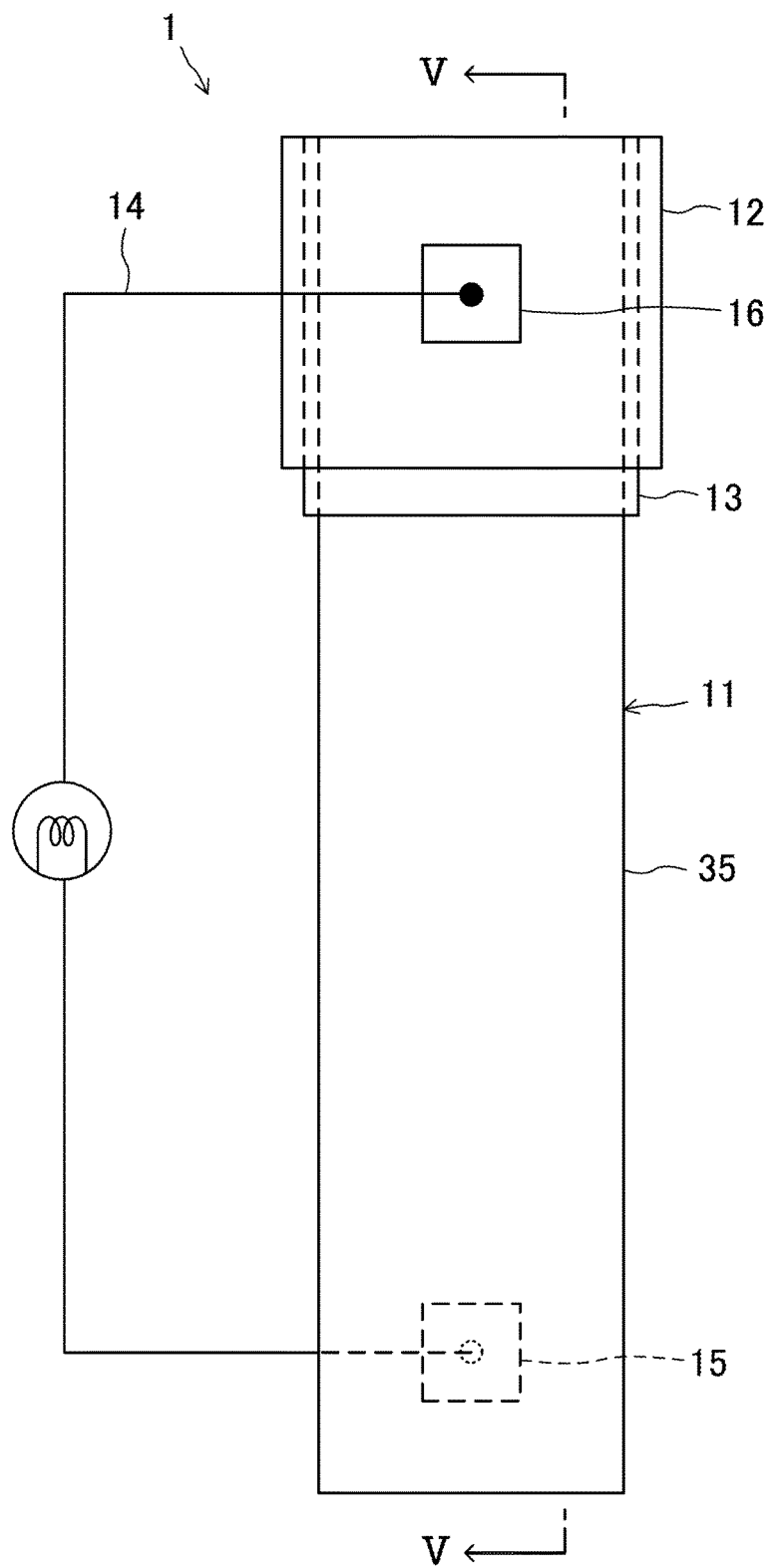
FIG. 4 is a front view of an air battery in a second embodiment.
Figure 5:
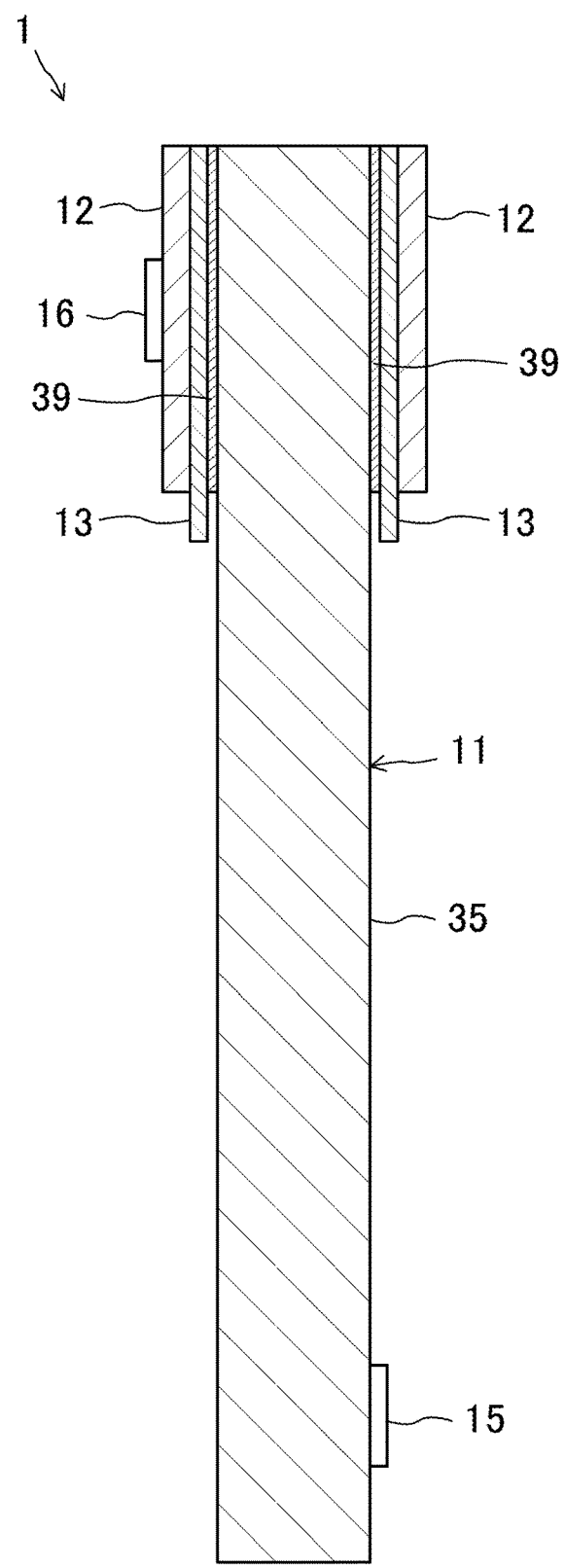
FIG. 5 is a sectional view along a V-V line of FIG. 4.

FIGS. 4 to 10 illustrate an air battery 1 of a second embodiment. FIG. 4 illustrates an outer appearance of a main portion of the air battery 1, and FIG. 5 illustrates a section along a V-V line of FIG. 4. As illustrated in FIGS. 4 and 5, the air battery 1 includes a band-shaped positive electrode 11 and a negative electrode 12 provided on one end side of the positive electrode 11 with a sheet layer 13 being interposed therebetween.

The sheet layer 13 is the same as that of the first embodiment, and is wound around one end portion of the positive electrode 11. The negative electrode 12 is metal foil such as aluminum foil, and is wound around the sheet layer 13. Note that the negative electrode 12 is not limited to the metal foil, and may be a metal plate, such as an aluminum plate, whose thickness is defined according to a use period of the air battery 1. As described above, the sheet layer 13 is interposed between the positive electrode 11 and the negative electrode 12, and the positive electrode 11 and the negative electrode 12 are insulated from each other by the sheet layer 13.

On the other end side of the positive electrode 11 on which the negative electrode 12 is not disposed, a terminal 15 for connecting a wire 14 is provided. Meanwhile, the negative electrode 12 is provided with a terminal 16 for connecting the wire 14. The terminals 15, 16 are formed of metal layers such as copper, for example.

Figure 7:
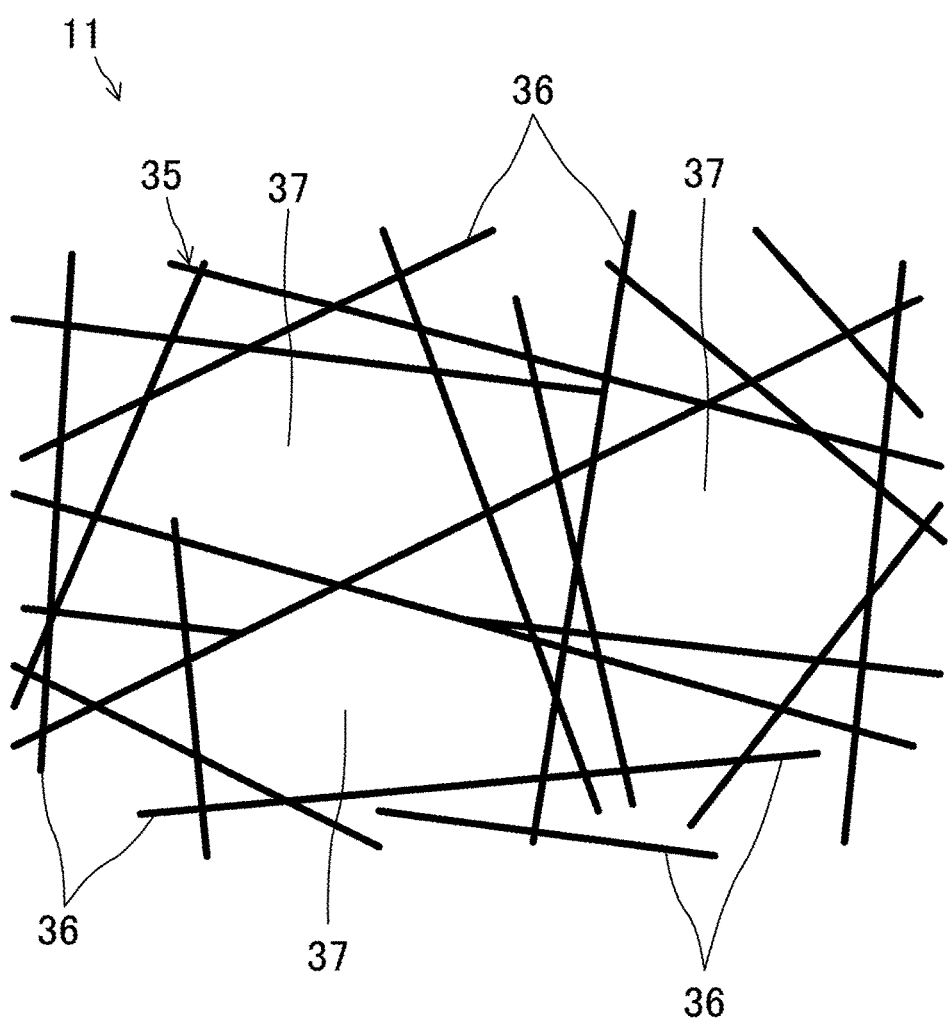
FIG. 7 is an enlarged schematic view of a structure of a positive electrode in the second embodiment.

The example where the base material of the positive electrode 11 is the solid resin such as the vinyl chloride has been described in the first embodiment. On the other hand, the positive electrode 11 of the second embodiment includes a base material 35 with many holes 37. FIG. 7 schematically illustrates an enlarged portion of the positive electrode 11. As illustrated in FIG. 7, the base material 35 is formed such that many fibrous materials 36 are collectively integrated, and clearances are provided among the fibrous materials 36 to form the many holes 37.

Each fibrous material 36 is preferably a fibrous material 36 forming Japanese paper, for example. The fibrous material 36 forming the Japanese paper is a fibrous material such as *Broussonetica kazinoki* (kouzo), *Edgeworthia papyrifera* (mitsumata), and *Diplomorpha sikokiana* (ganpi). Further, the root of *Abelmoschus manihot* is used as a "glutinous extract (neri)" as in the Japanese paper. However, the base material 35 has a lower density of the fibrous materials 36 as compared to that of typical Japanese paper. Thus, many relatively-large clearances (i.e., the holes 37) are formed among the fibrous materials 36 as described above. Unlike the Japanese paper, the many holes 37 of the base material 35 allow air to easily penetrate the base material 35.

The base material 35 carries an electrolyte and conductive particles. The electrolyte preferably contains sodium chloride, and the conductive particles are preferably made of a carbon material such as activated carbon. Moreover, the electrolyte preferably contains sodium hydrogen carbonate (sodium bicarbonate), for example. The sodium hydrogen carbonate is an ampholyte. Such sodium hydrogen carbonate and the sodium chloride are together contained as the electrolyte, and therefore, the output of the air battery 1 can be more increased as compared to the case of containing only the sodium chloride as the electrolyte.

The additive amount of the sodium hydrogen carbonate is preferably equal to or greater than 2% and equal to or less than 37%. As a result of experiment by the applicant of the present application, it is found that the output is not significantly increased when the additive amount of the sodium hydrogen carbonate is less than 2%. As the additive amount of the sodium hydrogen carbonate increases from 2%, the output tends to increase accordingly. When the additive amount exceeds 37%, the output of the air battery 1 tends to decrease. This might be because electron movement is blocked due to an extremely-large amount of the sodium hydrogen carbonate carried on the base material 35. Thus, the additive amount of the sodium hydrogen carbonate is preferably equal to or greater than 2% and equal to or less than 37%.

Figure 6:
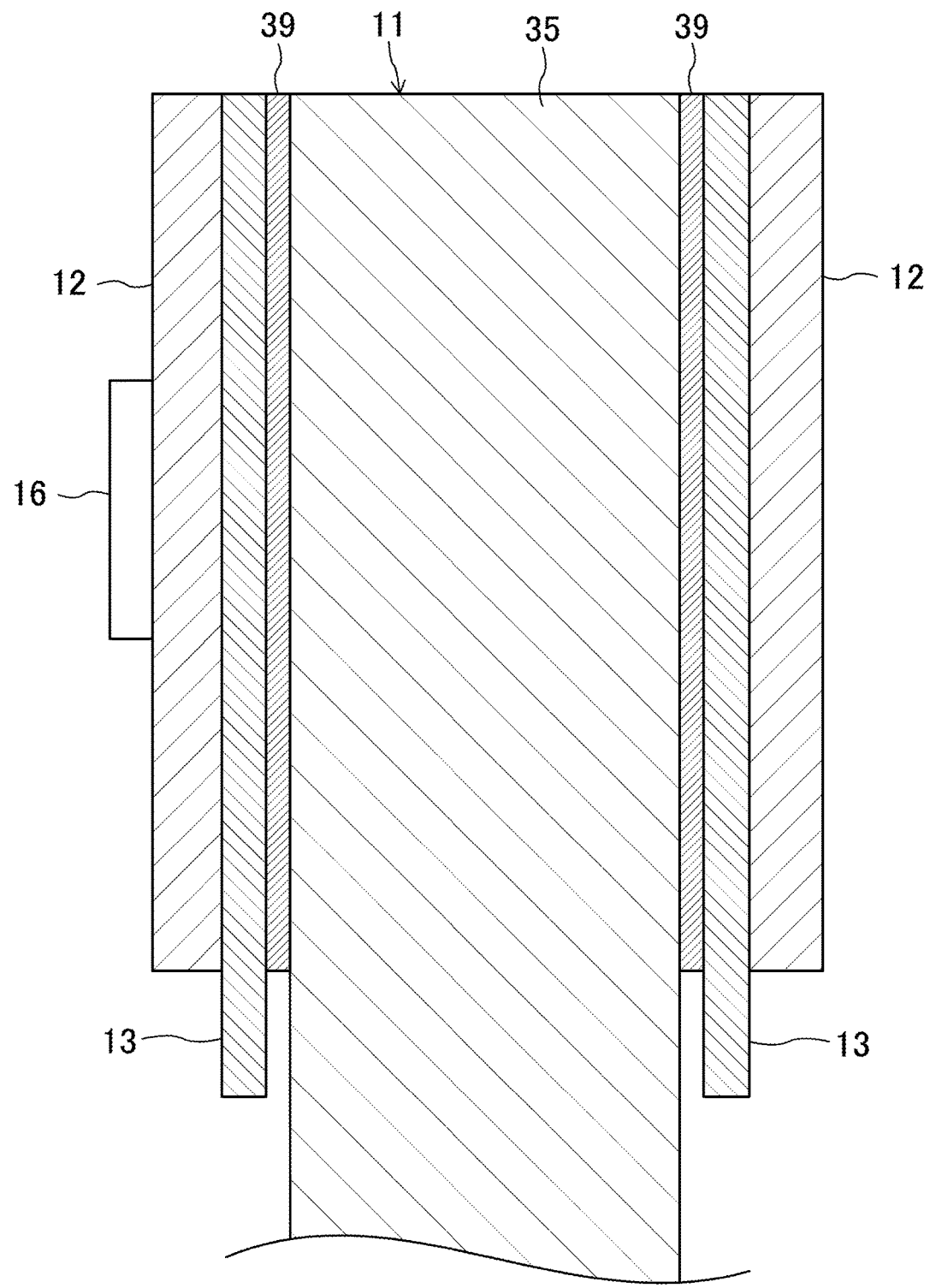
FIG. 6 is an enlarged sectional view of the vicinity of a negative electrode of the air battery in the second embodiment.

In the present embodiment, an electrolyte layer 39 containing sodium chloride and sodium hydrogen carbonate is provided on a surface portion of the positive electrode 11 as illustrated in FIGS. 5 and 6. The electrolyte layer 39 is formed by printing such as screen printing. In the case of performing screen printing of the electrolyte layer 39, a material mixture of the electrolyte and the fibrous materials 35 may be printed on a one-end-side surface portion of the base material 35.

Figure 8:
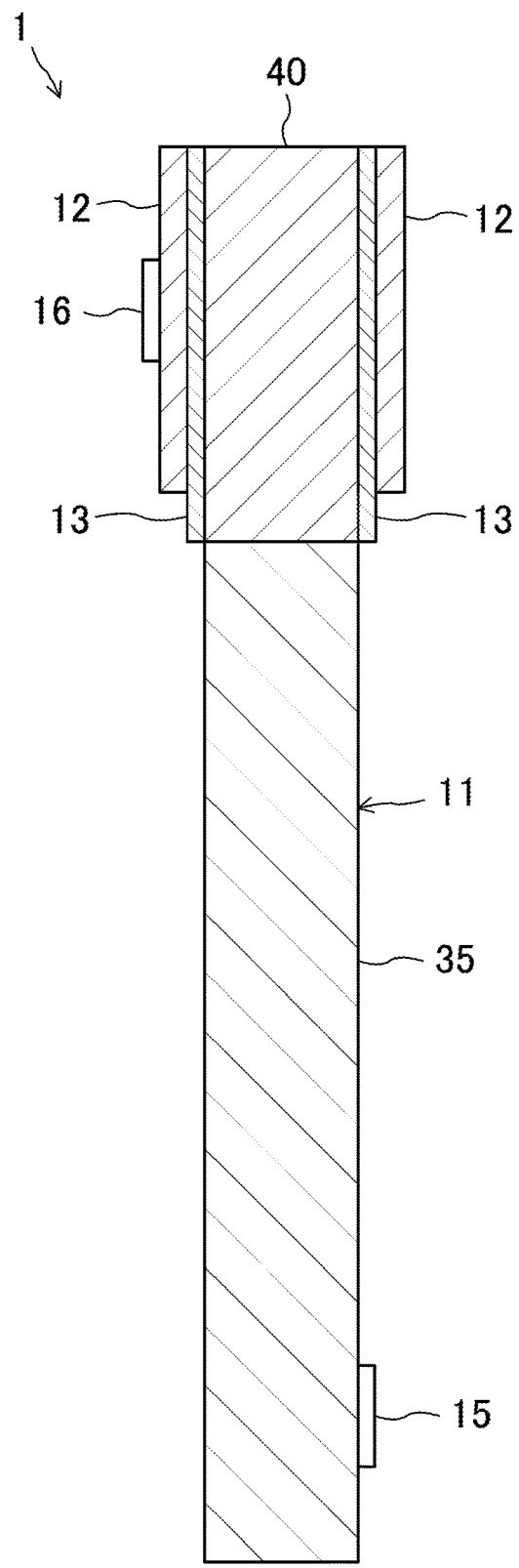
FIG. 8 is a sectional view of a structure of an air battery in another embodiment.

Note that as illustrated in FIG. 8, it may be configured such that one end portion of the positive electrode 11 forms an electrolyte-containing portion 40 containing the electrolyte from the surface of the base material 35 to the inside. The electrolyte-containing portion 50 can be formed in such a manner that one end side of the base material 35 carrying the activated carbon is dried after having been dipped in a water solution of the electrolyte.

Even in the above-described configuration in which the positive electrode 11 has the electrolyte-containing portion 40, the positive electrode 11 functions as the positive electrode 11 of the air battery 1. However, there is a probability that the electrolyte of the electrolyte-containing portion 40 penetrates, during a long period of use, the base material 35 and reaches the terminal 15 on the other end side of the positive electrode 11, and as a result, the terminal 15 is corroded. On the other hand, in the configuration in which the electrolyte layer 39 is printed, electrolyte movement is reduced, and therefore, corrosion of the terminal 15 can be favorably prevented.

Next, the method for manufacturing the positive electrode 11 will be described.

<First Manufacturing Method>

In the first method for manufacturing a positive electrode 11, a solution is first prepared, in which fibrous materials 36 containing at least one of *Broussonetica kazinoki* (kouzo), *Edgeworthia papyrifera* (mitsumata), and *Diplomorpha sikokiana* (ganpi) and "neri" extracted from the root of *Abelmoschus manihot* are dispersed in water. The concentration of the fibrous materials 36 and the "neri" in the solution is preferably equal to or greater than 32% and equal to or less than 55% with respect to a solution concentration in manufacturing of typical Japanese paper. Further, activated carbon etc. are dispersively added to the solution.

When the concentration of the fibrous materials 36 and the "neri" is less than 32%, current less flows due to extremely-large holes 37 in the positive electrode 11 (i.e., the internal resistance of the positive electrode 11 is extremely great). On the other hand, when the concentration of the fibrous materials 36 and the "neri" exceeds 55%, the influence of the "neri" becomes particularly great, leading to closing of the holes of the activated carbon. For this reason, the tendency of decreasing the output of an air battery 1 is increased. Thus, the concentration of the fibrous materials 36 and the "neri" in the solution is preferably equal to or greater than 32% and equal to or less than 55% with respect to the solution concentration in manufacturing of the typical Japanese paper.

Using a mesh-shaped screen ("su"), a solution mixture of the fibrous materials 36, the "neri," the activated carbon, etc. is filtered similarly in Japanese paper production. Subsequently, the filtered fibrous materials 36 etc. are moved from the screen to a drying table, and then, are dried. In this manner, a base material 35 is manufactured. Subsequently, e.g., an electrolyte layer 39 containing sodium chloride and sodium hydrogen carbonate is formed on the base material 35 by screen printing etc. Meanwhile, an electrolyte-containing portion 40 may be formed in such a manner that one end portion of the base material 35 is dried after having been dipped in a water solution of an electrolyte as described above. In this manner, a positive electrode 11 is manufactured.

<Second Manufacturing Method>

In the second method for manufacturing a positive electrode 11, a solution is first prepared, in which fibrous materials 36 containing at least one of *Broussonetica kazinoki* (kouzo), *Edgeworthia papyrifera* (mitsumata), and *Diplomorpha sikokiana* (ganpi) and "neri" extracted from the root of *Abelmoschus manihot* are dispersed in water. The concentration of the fibrous materials 36 and the "neri" in the solution is preferably equal to or greater than 40% and equal to or less than 100% with respect to a solution concentration in manufacturing of typical Japanese paper.

Using a mesh-shaped screen ("su"), a solution mixture of the fibrous materials 36 and the "neri" is filtered similarly in Japanese paper production. Subsequently, activated carbon etc. are sprayed over the entirety of the fibrous materials 36 etc. filtered by the screen. Next, the fibrous materials 36 etc. are moved to a drying table in a state in which the surface sprayed with the activated carbon etc. faces below. Subsequently, activated carbon etc. are sprayed over a surface of the fibrous materials 36 etc. moved to the drying table. Thus, the activated carbon etc. adhere to both surfaces of the filtered fibrous materials 36 etc., and penetrate these materials. Subsequently, the fibrous materials 36 etc. to which the activated carbon etc. are applied are dried on the drying table. In this manner, a base material 35 is manufactured.

Subsequently, e.g., an electrolyte layer 39 containing sodium chloride and sodium hydrogen carbonate is, as in the first manufacturing method, formed on the base material 35 by screen printing etc. Meanwhile, an electrolyte-containing portion 40 may be formed in such a manner that one end portion of the base material 35 is dried after having been dipped in a water solution of an electrolyte as described above. In this manner, a positive electrode 11 is manufactured.

In the second manufacturing method, the output of an air battery 1 increases as the concentration of the fibrous materials 36 and the "neri" decreases from 100%. When the concentration reaches less than 40%, current less flows due to extremely-large holes 37 in the positive electrode 11. Thus, the concentration of the fibrous materials 36 and the "neri" in the solution is preferably equal to or greater than 40% and equal to or less than 100% with respect to the solution concentration in manufacturing of the typical Japanese paper.

Next, the method for using the air battery 1 will be described.

Figure 9:
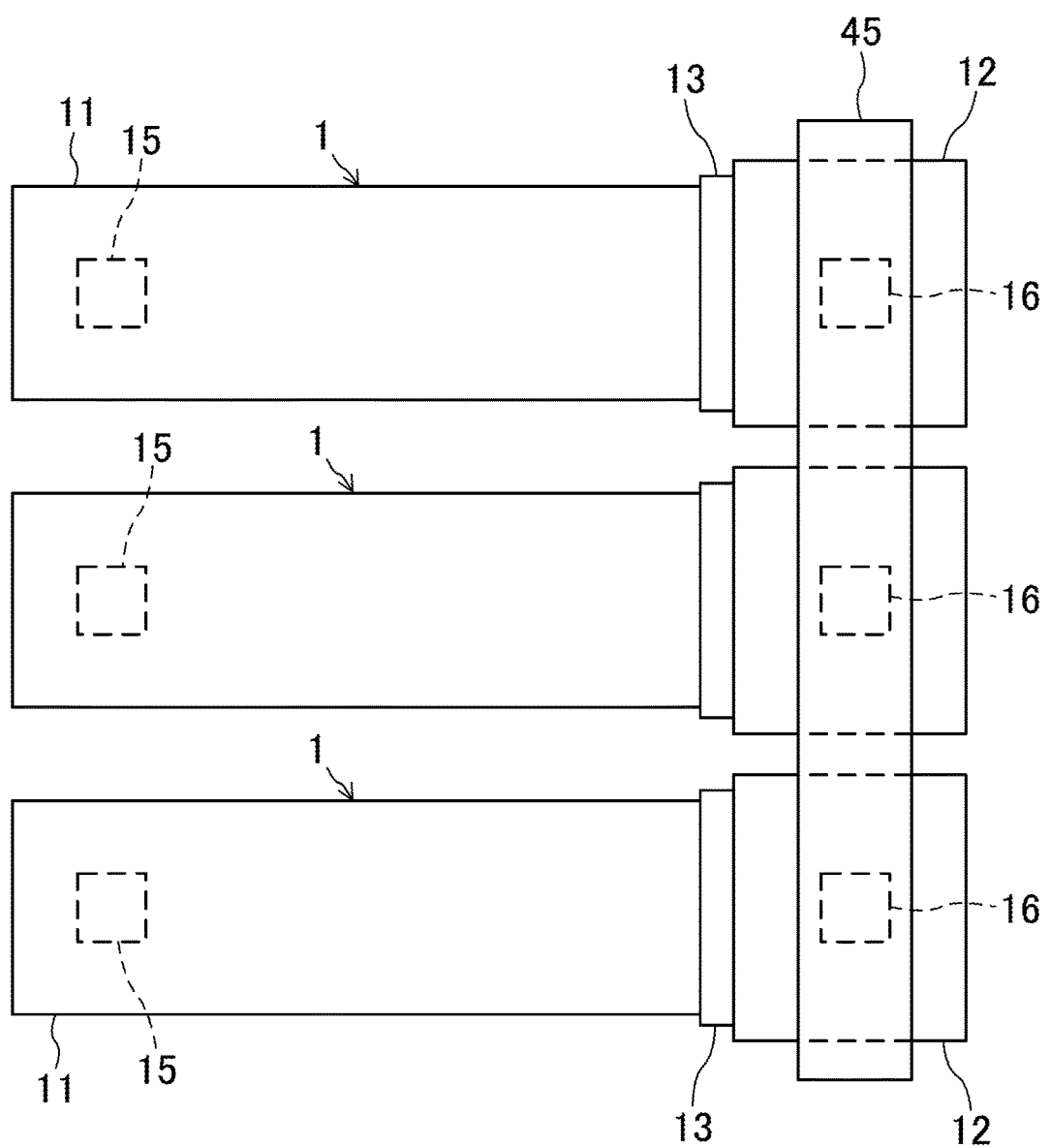
FIG. 9 is a front view of a structure in which a plurality of air batteries are connected in parallel in the second embodiment.
Figure 10:
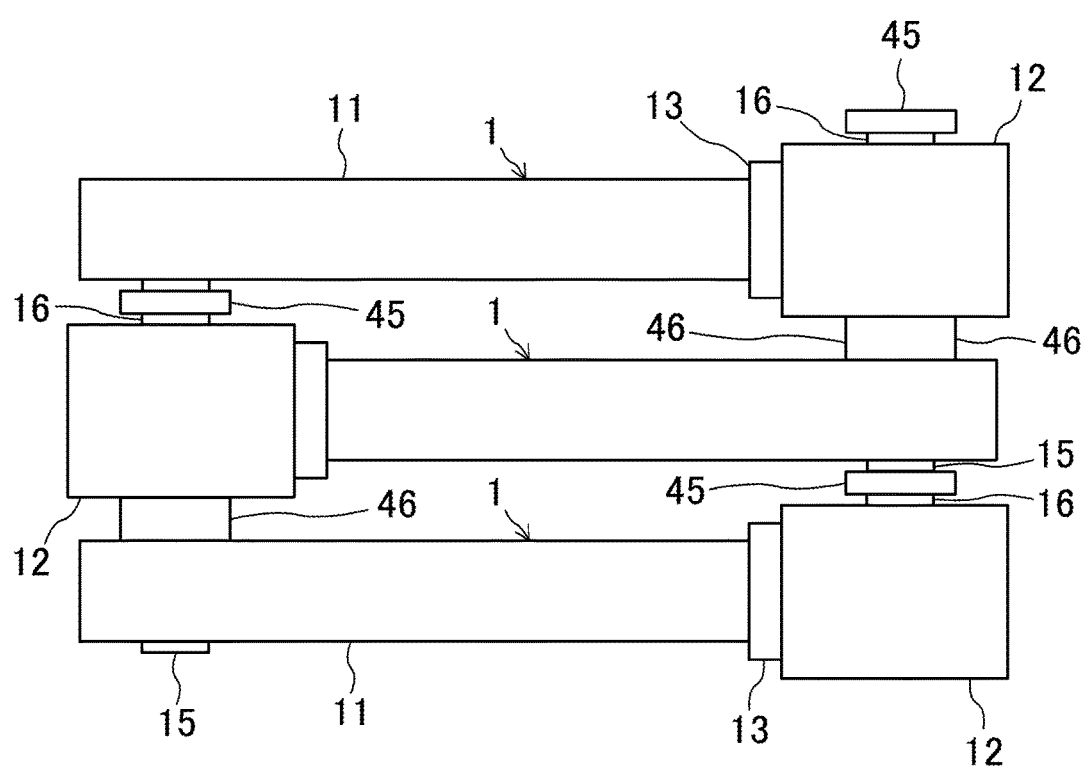
FIG. 10 is a side view of a structure in which a plurality of air batteries are connected in series in the second embodiment.

As illustrated in FIGS. 9 and 10, desired output and capacity can be provided by connection of a plurality of air batteries 1. For example, as illustrated in FIG. 9, terminals 16 are connected together through a wiring board 45 with the air batteries 1 being arranged next to each other. In this manner, the air batteries 1 are connected in parallel. The wiring board 45 is configured such that an insulating plate made of an insulating material is provided with a plurality of through-holes (not shown) and a metal film is formed on each through-hole. Thus, conduction is made between the front and back sides of the wiring board 45.

Next, multiple groups of the air batteries 1 connected in parallel are produced, and these groups of the air batteries 1 connected in parallel are stacked on each other such that the horizontal orientations thereof are alternately inverted as illustrated in FIG. 10. In this state, the terminal 16 of the positive electrode 11 in the lower group of the air batteries 1 is connected to the terminal 15 of the negative electrode 12 in the upper group of the air batteries 1 through the wiring board 45. Meanwhile, an insulating plate 46 is interposed between the negative electrode 12 of the upper group and the positive electrode 11 of the lower group. In this manner, the groups of the air batteries 1 connected in parallel are connected in series. The air batteries 1 are, in the direction of stacking the air batteries 1, preferably fixed together by means of, e.g., a spring-bis. Thus, even when the thickness of the negative electrode 12 decreases in connection with use of each air battery 1, such an air battery 1 can be reliably fixed.

The air battery 1 of the second embodiment can be placed in a building 10 as in the first embodiment. The present invention is not limited to above, and the air battery 1 can be placed at a wide variety of solids, movable bodies, etc. having internal spaces, such as automobiles, ships, and airplanes.

Thus, according to the second embodiment, it is configured as follows. The sheet layer 13 contains no electrolytic solution, and absorbs moisture from air as in the first embodiment. Thus, the electrolyte of the positive electrode 11 penetrates the sheet layer 13 to move toward the negative electrode 12 and that metal ions of the negative electrode 12 penetrate the sheet layer 13 to move toward the positive electrode 11. Consequently, an air battery utilizing moisture and oxygen in air and containing no electrolytic solution can be realized in a form which is extremely easy to handle.

In addition, it is configured such that the positive electrode 11 of the air battery 1 includes the base material 35 with the many holes 37 and that the base material 35 carries the electrolyte, the activated carbon, etc. Thus, surrounding air can be taken in the base material 35 through the holes 37. Consequently, a contact area between the positive electrode 11 and the air increases, and an electric generation efficiency can be significantly increased.

When a typical air battery including an electrolytic solution layer is configured such that a positive electrode contacting the electrolytic solution layer is provided with many holes 37 as in the present embodiment, there is a problem that an electrolytic solution of the electrolytic solution layer cannot be held by the positive electrode and penetrates the positive electrode to leak to the outside. On the other hand, the air battery 1 of the present embodiment is configured to include the sheet layer 13 without containing the electrolytic solution. Thus, the positive electrode 11 provided with the many holes 37 can be provided as described above.

Further, the base material 35 is formed of the assembly of the many fibrous materials 36, and therefore, the density of the fibrous materials 36 is adjusted so that the clearances among the fibrous materials 36 can be easily formed. Thus, the base material 35 provided with the many holes 37 formed by these clearances can be favorably formed. In particular, the fibrous materials 36 forming the Japanese paper are more preferably used because the highly-durable lightweight base material 35 can be provided.

In addition, the electrolyte layer 39 containing the electrolyte is provided on the one-end-side surface portion of the positive electrode 11. Thus, the electrolyte layer 39 and the terminal 15 can be arranged separated from each other, and penetration of the electrolyte toward the terminal 15 can be reduced. Thus, corrosion of the terminal 15 due to the electrolyte can be reduced. Moreover, the electrolyte layer 39 can be favorably formed by printing such as screen printing.

Moreover, the sodium chloride and the sodium hydrogen carbonate are contained as the electrolyte, and therefore, the electric generation efficiency of the air battery 1 can be significantly increased. Note that only the sodium hydrogen carbonate may be used as the electrolyte of the positive electrode 11. In the case of using only the sodium hydrogen carbonate, the additive amount thereof is preferably about 12.5%. Further, a sodium chloride additive amount of about 5% and a sodium hydrogen carbonate additive amount of about 7% are more preferably mixed upon use.

INDUSTRIAL APPLICABILITY

As described above, the present invention is useful for an air battery and a building including the air battery.

LIST OF REFERENCE NUMERALS

1 air battery
10 building
11 positive electrode
12 negative electrode
13 sheet layer
23 wall
27 underfloor portion
28 underroof portion
35 base material
36 fibrous material
37 hole
39 electrolyte layer

The invention claimed is:

1. An air battery comprising:
   a negative electrode containing metal as a negative electrode active material;
   a positive electrode formed in a solid state containing an electrolyte for ionizing the metal of the negative electrode and a conductive particle, and using oxygen as a positive electrode active material; and
   a sheet layer interposed between the positive electrode and the negative electrode, allowing the electrolyte contained in the positive electrode to penetrate toward the negative electrode, and allowing a metal ion generated in the negative electrode to penetrate toward the positive electrode,
   wherein
   the sheet layer is made of a material containing no electrolytic solution and exhibiting a hygroscopic property,
   the electrolyte contained in the positive electrode is able to penetrate the sheet layer having absorbed moisture from air, thereby moving toward the negative electrode,
   the metal ion generated in the negative electrode is able to penetrate the sheet layer having absorbed the moisture from the air, thereby moving toward the positive electrode,
   the positive electrode includes a base material carrying the electrolyte and the conductive particle and is provided with many holes,
   the base material is formed such that many fibrous materials are collectively integrated, clearances are provided among the fibrous materials to form the many holes, and
   the fibrous materials are fibrous materials including at least one of *Broussonetia kazinoki*, *Edgeworthia papyrifera*, or *Diplomorpha sikokiana*.

2. The air battery according to claim 1, wherein an electrolyte layer containing the electrolyte is provided on a surface portion of the positive electrode.

3. The air battery according to claim 2, wherein the electrolyte layer is formed by printing.

4. An air battery comprising:
   a negative electrode containing metal as a negative electrode active material;
   a positive electrode formed in a solid state containing an electrolyte for ionizing the metal of the negative electrode and a conductive particle, and using oxygen as a positive electrode active material; and a sheet layer interposed between the positive electrode and the negative electrode, allowing the electrolyte contained in the positive electrode to penetrate toward the negative electrode, and allowing a metal ion generated in the negative electrode to penetrate toward the positive electrode, wherein the sheet layer is made of a material containing no electrolytic solution and exhibiting a hygroscopic property, the electrolyte contained in the positive electrode is able to penetrate the sheet layer having absorbed moisture from air, thereby moving toward the negative electrode, the metal ion generated in the negative electrode is able to penetrate the sheet layer having absorbed the moisture from the air, thereby moving toward the positive electrode, and the positive electrode is made of solid resin in which the electrolyte and the conductive particle are dispersed.

5. The air battery according to claim 1, wherein the electrolyte contains sodium chloride, and the conductive particle is made of a carbon material.

6. An air battery comprising:

a negative electrode containing metal as a negative electrode active material;

a positive electrode formed in a solid state containing an electrolyte for ionizing the metal of the negative electrode and a conductive particle, and using oxygen as a positive electrode active material; and a sheet layer interposed between the positive electrode and the negative electrode, allowing the electrolyte contained in the positive electrode to penetrate toward the negative electrode, and allowing a metal ion generated in the negative electrode to penetrate toward the positive electrode, wherein the sheet layer is made of a material containing no electrolytic solution and exhibiting a hygroscopic property, the electrolyte contained in the positive electrode is able to penetrate the sheet layer having absorbed moisture from air, thereby moving toward the negative electrode, the metal ion generated in the negative electrode is able to penetrate the sheet layer having absorbed the moisture from the air, thereby moving toward the positive electrode, and the electrolyte contains sodium hydrogen carbonate.

7. A building wherein an air battery is housed in at least one of a wall, an underfloor portion, and an underroof portion, the air battery includes a negative electrode containing metal as a negative electrode active material, a positive electrode formed in a solid state containing an electrolyte for ionizing the metal of the negative electrode and a conductive particle and using oxygen as a positive electrode active material, and a sheet layer interposed between the positive electrode and the negative electrode, allowing the electrolyte contained in the positive electrode to penetrate toward the negative electrode, and allowing a metal ion generated in the negative electrode to penetrate toward the positive electrode, the sheet layer is made of a material containing no electrolytic solution and exhibiting a hygroscopic property, the electrolyte contained in the positive electrode is able to penetrate the sheet layer having absorbed moisture from air, thereby moving toward the negative electrode, the metal ion generated in the negative electrode is able to penetrate the sheet layer having absorbed the moisture from the air, thereby moving toward the positive electrode, the positive electrode includes a base material carrying the electrolyte and the conductive particle and is provided with many holes, the base material is formed such that many fibrous materials are collectively integrated, clearances are provided among the fibrous materials to form the many holes, and the fibrous materials are fibrous materials including at least one of *Broussonetica kazinoki*, *Edgeworthia papyrifera*, or *Diplomorpha sikokiana*.

8. A building wherein an air battery is housed in at least one of a wall, an underfloor portion, and an underroof portion, the air battery includes a negative electrode containing metal as a negative electrode active material, a positive electrode formed in a solid state containing an electrolyte for ionizing the metal of the negative electrode and a conductive particle and using oxygen as a positive electrode active material, and a sheet layer interposed between the positive electrode and the negative electrode, allowing the electrolyte contained in the positive electrode to penetrate toward the negative electrode, and allowing a metal ion generated in the negative electrode to penetrate toward the positive electrode, the sheet layer is made of a material containing no electrolytic solution and exhibiting a hygroscopic property, the electrolyte contained in the positive electrode is able to penetrate the sheet layer having absorbed moisture from air, thereby moving toward the negative electrode, the metal ion generated in the negative electrode is able to penetrate the sheet layer having absorbed the moisture from the air, thereby moving toward the positive electrode, and the positive electrode is made of solid resin in which the electrolyte and the conductive particle are dispersed.

9. A building wherein an air battery is housed in at least one of a wall, an underfloor portion, and an underroof portion, the air battery includes a negative electrode containing metal as a negative electrode active material, a positive electrode formed in a solid state containing an electrolyte for ionizing the metal of the negative electrode and a conductive particle and using oxygen as a positive electrode active material, and a sheet layer interposed between the positive electrode and the negative electrode, allowing the electrolyte contained in the positive electrode to penetrate toward the negative electrode, and allowing a metal ion generated in the negative electrode to penetrate toward the positive electrode, the sheet layer is made of a material containing no electrolytic solution and exhibiting a hygroscopic property, the electrolyte contained in the positive electrode is able to penetrate the sheet layer having absorbed moisture from air, thereby moving toward the negative electrode,
the metal ion generated in the negative electrode is able to penetrate the sheet layer having absorbed the moisture from the air, thereby moving toward the positive electrode, and
the electrolyte contains sodium hydrogen carbonate.

* * * * *